United States Patent
Chen et al.

(10) Patent No.: US 8,936,710 B2
(45) Date of Patent: Jan. 20, 2015

(54) LOW-MOLECULAR-RATIO CRYOLITE FOR ALUMINIUM ELECTROLYTIC INDUSTRY AND METHOD FOR PREPARING THE SAME

(71) Applicant: Shenzhen Sunxing Light Alloys Materials Co., Ltd, Baoan District, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN)

(73) Assignee: Shenzhen Sunxing Light Alloys Materials Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/160,655

(22) Filed: Jan. 22, 2014

(65) Prior Publication Data

US 2014/0131214 A1     May 15, 2014

Related U.S. Application Data

(62) Division of application No. 13/709,011, filed on Dec. 9, 2012.

(30) Foreign Application Priority Data

May 23, 2012 (CN) .......................... 2012 1 0161995
May 30, 2012 (CN) .......................... 2012 1 0172839

(51) Int. Cl.
*C25C 3/18* (2006.01)
*C01F 7/54* (2006.01)

(52) U.S. Cl.
CPC .... *C25C 3/18* (2013.01); *C01F 7/54* (2013.01)
USPC .......... 205/394; 423/116; 423/203; 423/465; 423/490

(58) Field of Classification Search
USPC ........................................................... 75/615
See application file for complete search history.

(56) References Cited

U.S. PATENT DOCUMENTS

| | | | | |
|---|---|---|---|---|
| 5,006,209 A | * | 4/1991 | Beck et al. | 205/336 |
| 2005/0092619 A1 | * | 5/2005 | Hryn et al. | 205/394 |
| 2008/0245447 A1 | * | 10/2008 | Birol et al. | 148/437 |

FOREIGN PATENT DOCUMENTS

| WO | WO 2012/042075 A1 * | 4/2012 | C25C 3/18 |
|---|---|---|---|
| WO | WO 2012/159590 A1 * | 11/2012 | C25C 3/18 |

OTHER PUBLICATIONS

Apisarov et al, "Physical-Chemical Properties of the KF-NaF-AlF3 molten system with low cryolite ratio", Light Metals, 2009, pp. 401-403.*
Dedyukhin et al, "Electrical conductivity of the KF-NaF-AlF3 molten system at low cryolite ratio", The Electrochemical Society, 214th ECS Meeting, 2009.*

* cited by examiner

*Primary Examiner* — Harry D Wilkins, III
(74) *Attorney, Agent, or Firm* — Jackson IPG PLLC

(57) ABSTRACT

The disclosure provides low-molecular-ratio cryolite for aluminum electrolytic industry, which consists of potassium cryolite and sodium cryolite with a mole ratio of 1:1~1:3, wherein the molecular formula of the potassium cryolite is $mKF \cdot AlF_3$ and the molecular formula of the sodium cryolite is $nNaF \cdot AlF_3$, where $m=1~1.5$ and $n=1~1.5$. When the low-molecular-ratio cryolite provided by the disclosure is applied to the aluminum electrolytic industry, electrolytic temperature and power consumption can be reduced and electrolytic efficiency is improved.

4 Claims, No Drawings

LOW-MOLECULAR-RATIO CRYOLITE FOR ALUMINIUM ELECTROLYTIC INDUSTRY AND METHOD FOR PREPARING THE SAME

TECHNICAL FIELD OF THE INVENTION

The disclosure relates to cryolite, and in particular to the low-molecular-ratio cryolite for aluminum electrolytic industry and a method for preparing the same.

BACKGROUND OF THE INVENTION

At present, aluminum electrolytic industry still employs a conventional Hall-Heroult process; electrolyte always takes cryolite-aluminum oxide as a basic system, and the cryolite generally adopts sodium fluoroaluminate. The aluminum electrolytic industry needs an electrolytic temperature of about 960 DEG C. and thus power consumption is high, this is mainly because the liquidus temperature of the electrolyte is high and it is necessary to keep a certain temperature of superheat degree to make the aluminum oxide have a better solubility.

The method for preparing cryolite in industry generally adopts a synthesis method, in which anhydrous hydrofluoric acid reacts with aluminum hydroxide to form fluoaluminic acid; then the fluoaluminic acid reacts with sodium hydroxide or potassium hydroxide at a high temperature; after processes of filtering, drying, melting and crushing, the cryolite is prepared, wherein the cryolite synthesized by this method has a molecular ratio of m=3.0, with a relatively high melting point. The cryolite synthesized by the existing industrial synthesis method has a molecular ratio of m=2.0-3.0, and it is difficult to obtain the relatively pure low-molecular-ratio cryolite containing extremely low water content with a molecular ratio of m=1.0-1.5.

Therefore, the conventional art has disadvantages that the electrolytic power consumption is high and the electrolyte is not ideal.

SUMMARY OF THE INVENTION

In order to solve the technical problem existing in the conventional art, the inventor has done a great deal of research in the selection and preparation of electrolyte and unexpectedly finds that taking the mixture of low-molecular-ratio potassium cryolite and low-molecular-ratio sodium cryolite with a certain ratio as the electrolyte of the aluminum electrolytic system can significantly reduce the electrolytic temperature compared with the conventional aluminum electrolytic system which takes sodium cryolite as the electrolyte, and has obvious advantages in corrosion to electrode materials compared with the aluminum electrolytic system which takes single low-molecular-ratio potassium cryolite or low-molecular-ratio sodium cryolite as the electrolyte, but has the electrolytic temperature decrease fallen in between the conventional aluminum electrolytic system which takes sodium cryolite as the electrolyte and the aluminum electrolytic system which takes single low-molecular-ratio potassium cryolite or low-molecular-ratio sodium cryolite as the electrolyte.

The disclosure provides low-molecular-ratio cryolite for aluminum electrolytic industry, which consists of potassium cryolite and sodium cryolite with a mole ratio of 1:1~1:3, wherein the molecular formula of the potassium cryolite is $mKF.AlF_3$, m=1~1.5; the molecular formula of the sodium cryolite is $nNaF.AlF_3$, n=1~1.5.

With the technical scheme above, when the low-molecular-ratio cryolite provided by the disclosure is applied to the aluminum electrolytic industry, the solubility property of aluminum oxide is improved, thus, the electrolytic temperature is reduced, the power consumption is reduced and the electrolytic efficiency is improved.

As a further improvement of the disclosure, m=1, 1.2 or 1.5; when m=1.0~1.5; the melting point of the potassium cryolite $mKF.AlF_3$ is between 540 and 570 DEG C., wherein the melting point of the $mKF.AlF_3$ slightly increases as the increase of m. n=1, 1.2 or 1.5; when n=1.0~1.5, the melting point of the $nNaF.AlF_3$ is between 960 and 1000 DEG C., wherein the melting point of the sodium cryolite $nNaF.AlF_3$ slightly increases as the increase of n.

As a further improvement of the disclosure, the mole ratio of the potassium cryolite to the sodium cryolite is 1:1; m=1.5 and n=1.5; the aluminum oxide has a solubility of 13 g/l in the system consisting of potassium cryolite and sodium cryolite with a mole ratio of 1:1 and the electrolytic temperature is between 825 and 900 DEG C.

Correspondingly, the disclosure also provides a method for preparing the low-molecular-ratio cryolite for aluminum electrolytic industry, which includes the following steps:

A) putting aluminum into a reactor, injecting an inert gas to the reactor after vacuumizing, heating the reactor to a temperature of between 700 and 850 DEG C., adding potassium fluotitanate, potassium fluoborate or mixture of they two in the reactor and stirring for 4 to 6 hours, pumping the superstratum melt liquid to obtain potassium cryolite; putting aluminum into another reactor, injecting an inert gas to the reactor after vacuumizing, heating the reactor to a temperature of between 700 and 850 DEG C., adding sodium fluotitanate, sodium fluoborate or mixture of they two in the reactor and stirring for 4 to 6 hours, pumping the superstratum melt liquid to obtain sodium cryolite; and B) mixing the obtained potassium cryolite with the obtained sodium cryolite in a mole ratio of 1:1~1:3.

The preparation method provided by the disclosure has advantages of mild reaction conditions, easy control, simple process, full reaction and high quality of reaction product.

As a further improvement of the disclosure, the method for preparing the low-molecular-ratio cryolite for aluminum electrolytic industry includes the following steps:

A) putting aluminum into a reactor, injecting an inert gas to the reactor after vacuumizing, heating the reactor to a temperature of between 780 and 850 DEG C., adding potassium fluotitanate in the reactor and stirring for 4 to 6 hours, pumping the superstratum melt liquid to obtain potassium cryolite of which the molecular formula is

putting aluminum into another reactor, injecting an inert gas to the reactor after vacuumizing, heating the reactor to a temperature of between 780 and 850 DEG C., adding sodium fluotitanate in the reactor and stirring for 4 to 6 hours, pumping the superstratum melt liquid to obtain sodium cryolite of which the molecular formula is

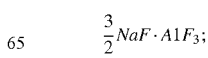

and

B) mixing the obtained potassium cryolite with the obtained sodium cryolite in a mole ratio of 1:1~1:3, wherein the reaction formula involved is:

$$\frac{3}{4}K_2TiF_6 + Al = \frac{3}{4}Ti - \frac{3}{2}KF \cdot AlF_3;$$

$$\frac{3}{4}Na_2TiF_6 + Al = \frac{3}{4}Ti + \frac{3}{2}NaF \cdot AlF_3.$$

As a further improvement of the disclosure, the method for preparing the low-molecular-ratio cryolite for aluminum electrolytic industry includes the following steps:

A) putting aluminum into a reactor, injecting an inert gas to the reactor after vacuumizing, heating the reactor to a temperature of between 700 and 850 DEG C., adding potassium fluoborate in the reactor and stirring for 4 to 6 hours, pumping the superstratum melt liquid to obtain potassium cryolite of which the molecular formula is $KF \cdot AlF_3$; putting aluminum into another reactor, injecting an inert gas to the reactor after vacuumizing, heating the reactor to a temperature of between 700 and 850 DEG C, adding sodium fluoborate in the reactor and stirring for 4 to 6 hours, pumping the superstratum melt liquid to obtain sodium cryolite of which the molecular formula is $NaF \cdot AlF_3$; and B) mixing the obtained potassium cryolite with the obtained sodium cryolite in a mole ratio of 1:1~1:3, wherein the reaction formula involved is:

KBF$_4$+Al=B+KF.AlF$_3$;NaBF$_4$+Al=B+NaF.AlF$_3$.

As a further improvement of the disclosure, the method for preparing the low-molecular-ratio cryolite for aluminum electrolytic industry includes the following steps:

A) putting aluminum into a reactor, injecting an inert gas to the reactor after vacuumizing, heating the reactor to a temperature of between 700 and 850 DEG C., adding the mixture of potassium fluoborate and potassium fluotitanate with a mole ratio of 2:1 in the reactor and stirring for 4 to 6 hours, pumping the superstratum melt liquid to obtain potassium cryolite of which the molecular formula is $$\frac{6}{5}KF \cdot AlF_3;$$

putting aluminum into another reactor, injecting an inert gas to the reactor after vacuumizing, heating the reactor to a temperature of between 700 and 850 DEG C., adding the mixture of sodium fluoborate and sodium fluotitanate with a mole ratio of 2:1 in the reactor and stirring for 4 to 6 hours, pumping the superstratum melt liquid to obtain sodium cryolite of which the molecular formula is $$\frac{6}{5}NaF \cdot AlF_3;$$

and

B) mixing the obtained potassium cryolite with the obtained sodium cryolite in a mole ratio of 1:1~1:3, wherein the reaction formula involved is:

$$K_2TiF_6 + 2KBF_4 + \frac{10}{3}Al = TiB_2 + \frac{10}{3}\left[\frac{6}{5}KF \cdot AlF_3\right];$$

$$Na_2TiF_6 + 2NaBF_4 + \frac{10}{3}Al = TiB_2 + \frac{10}{3}\left[\frac{6}{5}NaF \cdot AlF_3\right].$$

As a further improvement of the disclosure, the method for preparing the low-molecular-ratio cryolite for aluminum electrolytic industry includes the following steps:

A) putting excessive aluminum into a reactor, heating the reactor to a temperature of between 700 and 850 DEG C., adding the mixture of potassium fluoborate and potassium fluotitanate with a mole ratio of y:x in the reactor and stirring for 0.5 to 6 hours, pumping the superstratum melt liquid to obtain potassium cryolite of which the molecular formula is $$\frac{3y+6x}{3y+4x}KF \cdot AlF_3;$$

putting excessive aluminum into another reactor, heating the reactor to a temperature of between 700 and 850 DEG C., adding the mixture of sodium fluoborate and sodium fluotitanate with a mole ratio of y:x in the reactor and stirring for 0.5 to 6 hours, pumping the superstratum melt liquid to obtain sodium cryolite of which the molecular formula is $$\frac{3y+6x}{3y+4x}NaF \cdot AlF_3;$$

and

B) mixing the obtained potassium cryolite with the obtained sodium cryolite in a mole ratio of 1:1~1:3, wherein the reaction formula involved is:

$$K_2TiF_6 + KBF_4 + Al \longrightarrow Al \cdot Ti \cdot B + \frac{3y+6x}{3y+4x}KF \cdot AlF_3;$$

$$Na_2TiF_6 + NaBF_4 + Al \longrightarrow Al \cdot Ti \cdot B + \frac{3y+6x}{3y+4x}NaF \cdot AlF_3.$$

Compared with the conventional art, the disclosure achieves advantages as follows: when the low-molecular-ratio cryolite provided by the disclosure is applied to the aluminum electrolytic industry, the solubility property of aluminum oxide is improved, thus, the electrolytic temperature is reduced; and compared with the aluminum electrolytic system which takes the conventional cryolite or single low-molecular-ratio potassium cryolite or single low-molecular-ratio sodium cryolite as the electrolyte, the electrolytic temperature is obviously different and the corrosion to electrode materials is different too; the method provided by the disclosure for preparing the low-molecular-ratio cryolite has advantages of mild reaction conditions, easy control, simple process and full reaction.

DETAILED DESCRIPTION OF THE EMBODIMENTS

The disclosure is described below in further detail through specific embodiments.

Embodiment 1

Weighing 1 ton of aluminum and putting it into a reactor, injecting argon to the reactor for protection after vacuumizing, heating the reactor to a temperature of 800 DEG C., adding dried potassium fluotitanate in the reactor slowly in accordance with a reaction ratio and stirring quickly for 5 hours to form titanium sponge and potassium cryolite $$\left(\frac{3}{2}KF \cdot AlF_3\right),$$

opening the cover of the reactor, pumping the superstratum melt liquid potassium cryolite through a siphon-pump. Weighing 1 ton of aluminum and putting it into another reactor, injecting argon to the reactor for protection after vacuumizing, heating the reactor to a temperature of 800 DEG C., adding dried sodium fluotitanate in the reactor slowly in accordance with a reaction ratio and stirring quickly for 5 hours to form titanium sponge and sodium cryolite $$\left(\frac{3}{2}NaF \cdot AlF_3\right),$$

opening the cover of the reactor, pumping the superstratum melt liquid sodium cryolite through a siphon-pump.

Mixing the prepared potassium cryolite $$\left(\frac{3}{2}KF \cdot AlF_3\right),$$

with the prepared sodium cryolite $$\left(\frac{3}{2}NaF \cdot AlF_3\right),$$

in a mole ratio of 1:1 and applying the cryolite mixture to the aluminum electrolytic industry, wherein the electrolytic temperature can be controlled in a range of between 850 and 900 DEG C., and virgin aluminum can be obtained by using inert electrode materials or carbon electrode materials or mixed (combination of carbon and inert electrode materials) electrode materials to carry out electrolysis.

Embodiment 2

Weighing 1 ton of aluminum and putting it into a reactor, injecting argon to the reactor for protection after vacuumizing, heating the reactor to a temperature of 780 DEG C., adding dried potassium fluoborate in the reactor slowly in accordance with a reaction ratio and stirring quickly for 5 hours to form boron and potassium cryolite ($KF.AlF_3$), opening the cover of the reactor, pumping the superstratum melt liquid potassium cryolite through a siphon-pump. Weighing 1 ton of aluminum and putting it into another reactor, injecting argon to the reactor for protection after vacuumizing, heating the reactor to a temperature of 780 DEG C., adding dried sodium fluoborate in the reactor slowly in accordance with a reaction ratio and stirring quickly for 5 hours to form boron and sodium cryolite ($NaF.AlF_3$), opening the cover of the reactor, pumping the superstratum melt liquid sodium cryolite through a siphon-pump.

Mixing the prepared potassium cryolite ($KF.AlF_3$) with the prepared sodium cryolite ($NaF.AlF_3$) in a mole ratio of 1:1 and applying the cryolite mixture to the aluminum electrolytic industry, wherein the electrolytic temperature can be controlled in a range of between 825 and 900 DEG C., and virgin aluminum can be obtained by using inert electrode materials or carbon electrode materials or mixed (combination of carbon and inert electrode materials) electrode materials to carry out electrolysis.

Embodiment 3

Weighing 1 ton of aluminum and putting it into a reactor, injecting argon to the reactor for protection after vacuumizing, heating the reactor to a temperature of 750 DEG C., adding the mixture of dried potassium fluoborate and potassium fluotitanate in the reactor slowly in accordance with a reaction ratio, wherein the mole ratio of the potassium fluoborate to the potassium fluotitanate is 2:1; stirring quickly for 5 hours to form titanium boride and potassium cryolite $$\left(\frac{6}{5}KF \cdot AlF_3\right),$$

opening the cover of the reactor, pumping the superstratum melt liquid potassium cryolite through a siphon-pump. Weighing 1 ton of aluminum and putting it into a reactor, injecting argon to the reactor for protection after vacuumizing, heating the reactor to a temperature of 750 DEG C., adding the mixture of dried sodium fluoborate and sodium fluotitanate in the reactor slowly in accordance with a reaction ratio, wherein the mole ratio of the sodium fluoborate to the sodium fluotitanate is 2:1; stirring quickly for 5 hours to form titanium boride and sodium cryolite $$\left(\frac{6}{5}NaF \cdot AlF_3\right),$$

opening the cover of the reactor, pumping the superstratum melt liquid sodium cryolite through a siphon-pump.

Mixing the prepared potassium cryolite $$\left(\frac{6}{5}KF \cdot AlF_3\right),$$

with the prepared sodium cryolite $$\left(\frac{6}{5}NaF \cdot AlF_3\right),$$

in a mole ratio of 1:1 and applying the cryolite mixture to the aluminum electrolytic industry, wherein the electrolytic temperature can be controlled in a range of between 825 and 900 DEG C., and virgin aluminum can be obtained by using inert electrode materials or carbon electrode materials or mixed (combination of carbon and inert electrode materials) electrode materials to carry out electrolysis.

Embodiment 4

Mixing the prepared potassium cryolite ($KF \cdot AlF_3$) with the prepared sodium cryolite $$\left(\frac{6}{5} NaF \cdot AlF_3\right),$$

in a mole ratio of 1:3 and applying the cryolite mixture to the aluminum electrolytic industry, wherein the electrolytic temperature can be controlled in a range of between 850 and 900 DEG C., and virgin aluminum can be obtained by using inert electrode materials or carbon electrode materials or mixed (combination of carbon and inert electrode materials) electrode materials to carry out electrolysis.

Embodiment 5

Mixing the prepared potassium cryolite $$\left(\frac{3}{2} KF \cdot AlF_3\right),$$

with the prepared sodium cryolite ($NaF \cdot AlF_3$) in a mole ratio of 1:3 and applying the cryolite mixture to the aluminum electrolytic industry, wherein the electrolytic temperature can be controlled in a range of between 850 and 900 DEG C., and virgin aluminum can be obtained by using inert electrode materials or carbon electrode materials or mixed (combination of carbon and inert electrode materials) electrode materials to carry out electrolysis.

Embodiment 6

Mixing the prepared potassium cryolite $$\left(\frac{6}{5} KF \cdot AlF_3\right),$$

with the prepared sodium cryolite $$\left(\frac{3}{2} NaF \cdot AlF_3\right),$$

in a mole ratio of 1:3 and applying the cryolite mixture to the aluminum electrolytic industry, wherein the electrolytic temperature can be controlled in a range of between 850 and 900 DEG C., and virgin aluminum can be obtained by using inert electrode materials or carbon electrode materials or mixed (combination of carbon and inert electrode materials) electrode materials to carry out electrolysis.

Embodiment 7

Weighing 5 tons of aluminum and putting it into a reactor, heating the reactor to a temperature of 750 DEG C., adding 2 tons of mixture of dried potassium fluoborate and potassium fluotitanate in the reactor slowly, wherein the mole ratio of the potassium fluoborate to the potassium fluotitanate is 1:1; stirring quickly for 4 hours to form aluminum-titanium-boron alloy and potassium cryolite $$\left(\frac{9}{7} KF \cdot AlF_3\right),$$

due to excessive aluminum, opening the cover of the reactor, pumping the superstratum melt liquid potassium cryolite through a siphon-pump. Weighing 5 tons of aluminum and putting it into a reactor, heating the reactor to a temperature of 750 DEG C., adding 2 tons of mixture of dried sodium fluoborate and sodium fluotitanate in the reactor slowly, wherein the mole ratio of the sodium fluoborate to the sodium fluotitanate is 1:1; stirring quickly for 4 hours to form aluminum-titanium-boron alloy and sodium cryolite $$\left(\frac{9}{7} NaF \cdot AlF_3\right)$$

due to excessive aluminum, opening the cover of the reactor, pumping the superstratum melt liquid sodium cryolite through a siphon-pump.

Mixing the prepared potassium cryolite $$\left(\frac{9}{7} KF \cdot AlF_3\right)$$

with the prepared sodium cryolite $$\left(\frac{9}{7} NaF \cdot AlF_3\right)$$

in a mole ratio of 1:3 and applying the cryolite mixture to the aluminum electrolytic industry, wherein the electrolytic temperature can be controlled in a range of between 850 and 900 DEG C., and virgin aluminum can be obtained by using inert electrode materials or carbon electrode materials or mixed (combination of carbon and inert electrode materials) electrode materials to carry out electrolysis.

The above are the further detailed description of the disclosure made in conjunction with specific preferred embodiments; it can not be considered that the specific embodiment of the disclosure is only limited to the description above. For the common technicians in the technical field of the disclosure, umpty simple deductions or substitutes can be made without departing from the concept of the disclosure and they are deemed to be included within the scope of protection of the disclosure.

What is claimed is:
1. A method for preparing a low-molecular-ratio cryolite for aluminium electrolytic industry, which consists of potassium cryolite and sodium cryolite with a mole ratio of 1:1~1:3, wherein the molecular formula of the potassium cryolite is $mKF \cdot AlF_3$, m=1~1.5; the molecular formula of the sodium cryolite is $nNaF \cdot AlF_3$, n=1~1.5, the method including the following steps:
  A) putting aluminium into a reactor, injecting an inert gas to the reactor after vacuumizing, heating the reactor to a temperature of between 700 and 850 DEG C, adding potassium fluotitanate or a mixture of potassium fluotitanate and potassium fluoborate in the reactor and stirring for 4 to 6 hours, pumping the superstratum melt liquid to obtain potassium cryolite;

B) putting aluminium into another reactor, injecting an inert gas to the reactor after vacuumizing, heating the reactor to a temperature of between 700 and 850 DEG C., adding sodium fluotitanate or, alternatively, sodium fluoborate two in the reactor and stirring for 4 to 6 hours, pumping the superstratum melt liquid to obtain sodium cryolite; and C) mixing the obtained potassium cryolite with the obtained sodium cryolite in a mole ratio of 1:1~1:3.

2. The method for preparing the low-molecular-ratio cryolite for aluminium electrolytic industry according to claim 1, including the following steps:

A) putting aluminium into a reactor, injecting an inert gas to the reactor after vacuumizing, heating the reactor to a temperature of between 780 and 850 DEG C, adding potassium fluotitanate in the reactor and stirring for 4 to 6 hours, pumping the superstratum melt liquid to obtain potassium cryolite of which the molecular formula is $$\frac{3}{2}KF \cdot AlF_3;$$

putting aluminium into another reactor, injecting an inert gas to the reactor after vacuumizing, heating the reactor to a temperature of between 780 and 850 DEG C., adding sodium fluotitanate in the reactor and stirring for 4 to 6 hours, pumping the superstratum melt liquid to obtain sodium cryolite of which the molecular formula is $$\frac{3}{2}NaF \cdot AlF_3;$$

and

B) mixing the obtained potassium cryolite with the obtained sodium cryolite in a mole ratio of 1:1~1:3.

3. A method for preparing a low-molecular-ratio cryolite for aluminium electrolytic industry, which consists of potassium cryolite and sodium cryolite with a mole ratio of 1:1~1:3, wherein the molecular formula of the potassium cryolite is $mKF \cdot AlF_3$, $m=1~1.5$; the molecular formula of the sodium cryolite is $nNaF \cdot AlF_3$, $n=1~1.5$, wherein $m=1$, 1.2 or 1.5; $n=1$, 1.2 or 1.5, the method including the following steps:

A) putting aluminium into a reactor, injecting an inert gas to the reactor after vacuumizing, heating the reactor to a temperature of between 700 and 850 DEG C, adding potassium fluotitanate or a mixture of potassium fluotitanate and potassium fluoborate in the reactor and stirring for 4 to 6 hours, pumping the superstratum melt liquid to obtain potassium cryolite;

B) putting aluminium into another reactor, injecting an inert gas to the reactor after vacuumizing, heating the reactor to a temperature of between 700 and 850 DEG C., adding sodium fluotitanateor, alternatively, sodium fluoborate in the reactor and stirring for 4 to 6 hours, pumping the superstratum melt liquid to obtain sodium cryolite; and C) mixing the obtained potassium cryolite with the obtained sodium cryolite in a mole ratio of 1:1~1:3.

4. The method for preparing the low-molecular-ratio cryolite for aluminium electrolytic industry according to claim 3, including the following steps:

A) putting aluminium into a reactor, injecting an inert gas to the reactor after vacuumizing, heating the reactor to a temperature of between 780 and 850 DEG C, adding potassium fluotitanate in the reactor and stirring for 4 to 6 hours, pumping the superstratum melt liquid to obtain potassium cryolite of which the molecular formula is $$\frac{3}{2}KF \cdot AlF_3;$$

putting aluminium into another reactor, injecting an inert gas to the reactor after vacuumizing, heating the reactor to a temperature of between 780 and 850 DEG C., adding sodium fluotitanate in the reactor and stirring for 4 to 6 hours, pumping the superstratum melt liquid to obtain sodium cryolite of which the molecular formula is $$\frac{3}{2}NaF \cdot AlF_3;$$

and

B) mixing the obtained potassium cryolite with the obtained sodium cryolite in a mole ratio of 1:1~1:3.

\* \* \* \* \*